(12) United States Patent
Chernyavskiy

(10) Patent No.: US 12,482,166 B2
(45) Date of Patent: Nov. 25, 2025

(54) THUMBNAIL ANIMATION FOR MEDICAL IMAGING

(71) Applicant: KONINKLIJKE PHILIPS N.V., Eindhoven (NL)

(72) Inventor: Alexey Chernyavskiy, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 144 days.

(21) Appl. No.: 18/579,014

(22) PCT Filed: Jul. 8, 2022

(86) PCT No.: PCT/EP2022/069054
§ 371 (c)(1),
(2) Date: Jan. 12, 2024

(87) PCT Pub. No.: WO2023/285305
PCT Pub. Date: Jan. 19, 2023

(65) Prior Publication Data
US 2024/0338876 A1    Oct. 10, 2024

(30) Foreign Application Priority Data
Jul. 16, 2021   (RU) .......................... RU2021121121

(51) Int. Cl.
*G06T 13/80*   (2011.01)
*G06T 5/70*   (2024.01)
(Continued)

(52) U.S. Cl.
CPC ............... *G06T 13/80* (2013.01); *G06T 5/70* (2024.01); *G06V 10/25* (2022.01); *G06V 10/462* (2022.01);
(Continued)

(58) Field of Classification Search
CPC . G06T 13/80; G06T 5/70; G06T 2207/20081; G06T 2207/20084;
(Continued)

(56) References Cited

U.S. PATENT DOCUMENTS 7,457,656 B2    11/2008    Judd et al.
8,786,601 B2 *   7/2014    Lehmann ................ G06T 19/00
                                                        382/128
(Continued)

FOREIGN PATENT DOCUMENTS

KR    20150111541 A    10/2015
WO    WO-2021116150 A1 *  6/2021    ............. G06V 10/25

OTHER PUBLICATIONS

Gu et al., "From Thumbnails to Summaries—A Single Deep Neural Network to Rule Them All", (2018) pp. 1-6.
(Continued)

*Primary Examiner* — Benny Q Tieu

(57) ABSTRACT

A computer-implemented method of generating a medical imaging thumbnail animation (325) includes obtaining a plurality of medical images (324) from a medical imaging examination, and automatically defining a zone of interest to identify in the plurality of medical images (324). The computer-implemented method also includes identifying, by a processor (1221), the zone of interest in the plurality of medical images (324) using a trained artificial intelligence algorithm, and generating, using a second algorithm, the medical imaging thumbnail animation (325) to simulate movement of a virtual camera on a path in the zone of interest in the plurality of medical images (324).

20 Claims, 7 Drawing Sheets

(51) Int. Cl.
  *G06V 10/25* (2022.01)
  *G06V 10/46* (2022.01)
  *G16H 30/20* (2018.01)

(52) U.S. Cl.
  CPC ... *G16H 30/20* (2018.01); *G06T 2207/20084* (2013.01); *G06V 2201/07* (2022.01)

(58) Field of Classification Search
  CPC ..... G06T 7/0012; G06T 19/003; G06V 10/25; G06V 10/462; G06V 2201/07; G16H 30/20
  USPC ........ 345/581, 589, 601, 473; 382/128, 100, 382/132
  See application file for complete search history.

(56) References Cited

U.S. PATENT DOCUMENTS

| | | | |
|---|---|---|---|
| 12,073,528 B2* | 8/2024 | Shah | G16H 50/50 |
| 12,322,105 B2* | 6/2025 | Park | G06T 7/174 |
| 2009/0309874 A1 | 12/2009 | Salganicoff et al. | |
| 2010/0091330 A1 | 4/2010 | Marchesotti et al. | |
| 2012/0036466 A1 | 2/2012 | Venon et al. | |
| 2015/0117783 A1 | 4/2015 | Lin et al. | |
| 2019/0132520 A1 | 5/2019 | Gupta et al. | |
| 2020/0349699 A1 | 11/2020 | Shah | |

OTHER PUBLICATIONS

Safonov et al., "Animated thumbnail for still image", Graphicon 2010, pp. 79-86 (2010).

Dimas et al., "MedGaze: Gaze Estimation on WCE Images Based on a CNN Autoencoder", 2019 IEEE 19th International Conference on Bioinformatics and Bioengineering (BIBE), (2019), pp. 363-367.

Hou et al., "Thumbnail Generation Based on Global Saliency", Advances in Cognitive Neurodynamics ICCN 2007, (2008), pp. 999-1003.

Lévêque et al., "State of the Art: Eye-Tracking Studies in Medical Imaging", IEEE Access, vol. 6, Jun. 28, 2018, pp. 37023-37034.

Sun et al., "SAUNet: Shape Attentive U-Net for Interpretable Medical Image Segmentation", arXiv dated to Mar. 16, 2020, pp. 1-10.

International Search report and Written Opinion of PCT/EP2022/069054, dated Jan. 12, 2023.

* cited by examiner

THUMBNAIL ANIMATION FOR MEDICAL IMAGING

CROSS-REFERENCE TO PRIOR APPLICATIONS

This application is the U.S. National Phase application under 35 U.S.C. § 371 of International Application No. PCT/EP2022/069054, filed on Jul. 8, 2022, which claims the benefit of Russian Patent Application No. 2021121121, filed on Jul. 16, 2021. These applications are hereby incorporated by reference herein.

BACKGROUND

A radiologist may encounter hundreds of patient images in a day. Patient images are typically images captured by medical imaging systems during medical exams, and typically reflect medical exam data. Medical exam data may be annotated to the patient images by assigning meaningful file names to the files of the patient images, or meaningful folder names to image folders that correlate to the files of the patient images. When a radiologist needs to load patient images for a particular patient, the radiologist may search for and find a name of the patient in a picture archiving and communication system (PACS). In order to bring up patient images from another patient with a similar condition, more sophisticated browsing or searching with one or more specific keyword(s) is required. However, the radiologist might want to quickly find analogies based purely on the visual appearance of anatomy in the patient images.

Currently, graphical thumbnails may be displayed for every medical image in the graphical user interface (GUI) of the PACS. However, each medical exam may involve capturing tens or hundreds of patient images. Moreover, many patient images are not informative and are not relevant for a particular research or treatment context.

When looking for analogical medical imagery from medical images for the same patient or among different patients, a clinical specialist may need to open multiple medical images in a PACS from multiple previously recorded medical exams from a PACS. Since a typical exam may consist of hundreds of medical images, the loading process may take some time, whereas upon even a quick inspection, the clinical specialist may decide that any particular potential analogical case is irrelevant to the current query and proceed to load the data for the next potential analogical case that is hopefully more relevant.

Ordinary thumbnails are too small to provide a meaningful view of the features in medical images that are characteristic of a particular patient's medical condition. Additionally, ordinary thumbnails individually represent only one medical image, whereas a set of medical images may include a much larger volume of data.

SUMMARY

According to an aspect of the present disclosure, a computer-implemented method of generating a medical imaging thumbnail animation includes obtaining a plurality of medical images from a medical imaging examination, and automatically defining a zone of interest to identify in the plurality of medical images. The computer-implemented method also includes identifying, by a processor, the zone of interest in the plurality of medical images using a trained artificial intelligence algorithm, and generating, using a second algorithm, the medical imaging thumbnail animation to simulate movement of a virtual camera on a path in the zone of interest in the plurality of medical images.

According to another aspect of the present disclosure, a system for generating a medical imaging thumbnail animation includes a memory and a processor. The memory stores instructions and medical images from a plurality of medical imaging examinations. The processor executes the instructions to process the medical images from the plurality of medical imaging examinations. When executed by the processor, the instructions cause the system to obtain a plurality of medical images from a medical imaging examination, and automatically define a zone of interest to identify in the plurality of medical images. The instructions also cause the system to identify the zone of interest in the plurality of medical images using a trained artificial intelligence algorithm, and generate, using a second algorithm, the medical imaging thumbnail animation to simulate movement of a virtual camera on a path in the zone of interest in the plurality of medical images.

According to yet another aspect of the present disclosure, a computer-readable medium stores a program for generating a medical imaging thumbnail animation. When executed by a processor, the program causes a computing apparatus to obtain a plurality of medical images from a medical imaging examination, and to automatically define a zone of interest to identify in the plurality of medical images. The program also causes the computing apparatus to identify the zone of interest in the plurality of medical images using a trained artificial intelligence algorithm, and to generate, using a second algorithm, the medical imaging thumbnail animation to simulate movement of a virtual camera on a path in the zone of interest in the plurality of medical images.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
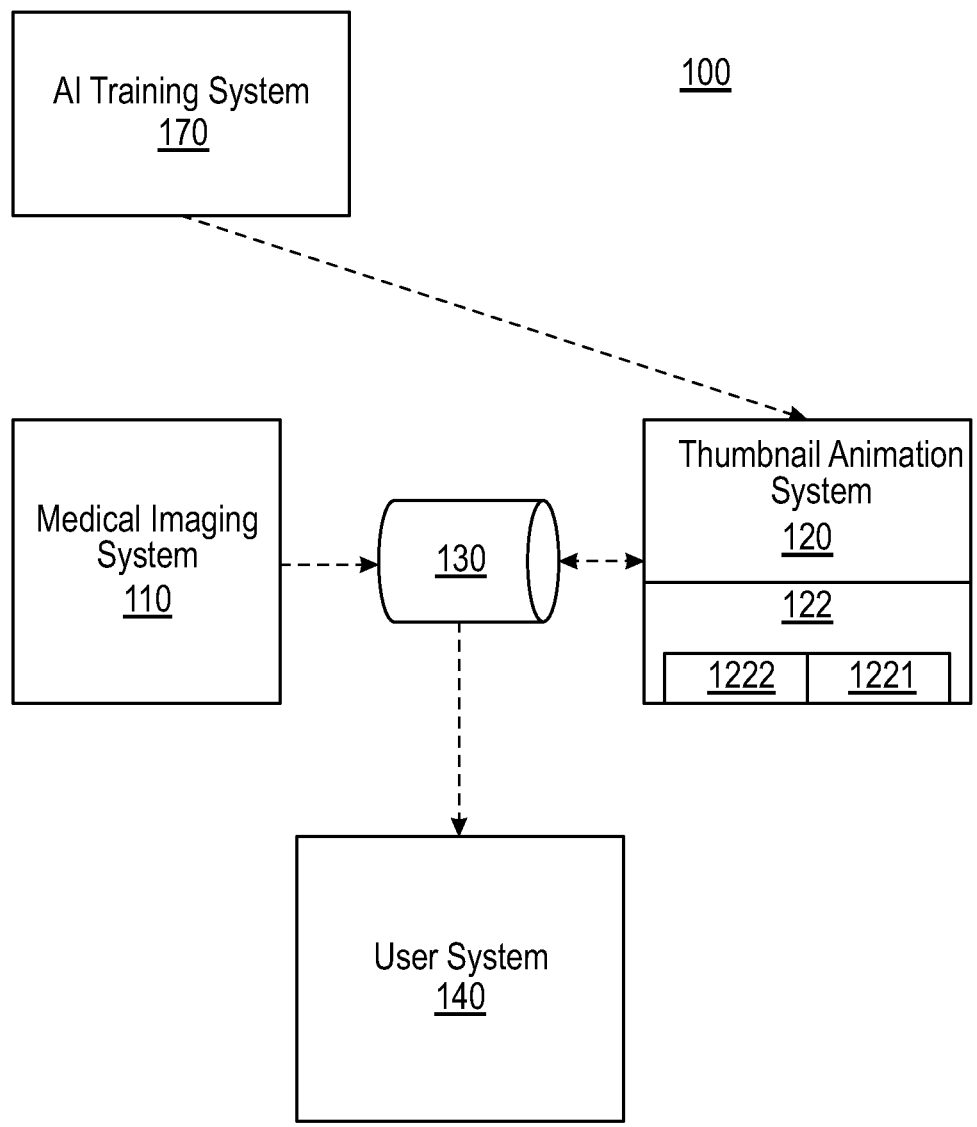
FIG. 1 illustrates a system for thumbnail animation for medical imaging, in accordance with a representative embodiment.

In the following detailed description, for the purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

As described herein, animated thumbnail visualizations may be generated for each medical exam. The animated thumbnail visualizations may feature primary zones of interest in the patient images. The zones of interest may be defined automatically based on one or more task(s) being performed in the medical exam, image modality, etc. The zones of interest may be automatically detected in the patient images and used to generate animated thumbnails.

FIG. 1 illustrates a system 100 for thumbnail animation for medical imaging, in accordance with a representative embodiment.

The system 100 in FIG. 1 includes components that may be provided together or that may be distributed. The system 100 includes a medical imaging system 110, a thumbnail animation system 120, a memory system 130, a user system 140, and an AI training system 170. The thumbnail animation system 120 includes a controller 122, and the controller 122 includes a memory 1222 that stores instructions and a processor 1221 that executes the instructions. The processor 1221 may execute the instructions to perform one or more steps or functions of methods attributed to a thumbnail animation system 120 herein.

The medical imaging system 110 is representative of one or more medical imaging system(s) that generate medical images during patient examinations. Medical imaging system(s) that may be represented by the medical imaging system 110 include, but are not limited to, X-ray imaging systems, ultrasound imaging systems, magnetic resonance imaging (MRI) systems, computed tomography (CT) imaging systems, fluoroscopy imaging systems, and positron emission tomography (PET) imaging systems.

The medical imaging system 110 may be provided together with the thumbnail animation system 120, such as in the same facility or medical complex. However, the medical imaging system 110 may alternatively be provided entirely separately from the thumbnail animation system 120. For example, medical images from the medical imaging system 110 may be stored locally in the memory system 130 and then transmitted to or retrieved by the thumbnail animation system 120 even when the thumbnail animation system 120 is provided as a third-party service separate from the medical imaging system 110 and the memory system 130. Medical images may be provided directly or indirectly from the medical imaging system 110 to the thumbnail animation system 120 over a network such as a local area network (LAN) or a wide area network (WAN) such as the internet. Alternatively, medical images may be provided to the thumbnail animation system 120 on a portable memory such as a memory stick or computer-readable disk.

The memory system 130 may be or include a picture archiving and communication system (PACS). The memory system 130 may obtain and store medical images from multiple medical imaging systems including the medical imaging system 110, and make the medical images available to users via the user system 140. The memory system 130 may store large volumes of medical images and information, and may therefore include distributed memory elements connected over an electronic communication network. Medical images and information may be retrieved from the memory system 130 and stored in the memory system 130 by authorized users, and may otherwise be maintained secure from unauthorized users.

The user system 140 may be used by users to obtain medical images and thumbnail animations corresponding to the medical images from the memory system 130. The user system 140 may include one or more computer(s), one or more monitor(s), and one or more input device(s) such as a keyboard, mouse and/or microphone. The user system 140 may also include other types of electronic equipment by which users may retrieve and view medical images and thumbnail animations corresponding to the medical images. An example of the user system 140 is shown in and described with respect to FIG. 5 An example of a computer used in the user system 140 is shown in and described with respect to the computer system 600 shown in FIG. 6.

The AI training system 170 is an artificial intelligence training system and may train artificial intelligence that is provided to multiple thumbnail animation systems including the thumbnail animation system 120. The AI training system 170 may be provided entirely separately from the thumbnail animation system 120, such as by a third-party service, but may alternatively be provided together with the thumbnail animation system 120. Trained artificial intelligence may be provided from the AI training system 170 to the thumbnail animation system 120 over a network such as a local area network (LAN) or a wide area network (WAN) such as the internet. Alternatively, trained artificial intelligence may be provided to the thumbnail animation system 120 on a portable memory such as a memory stick or a computer-readable disk.

The thumbnail animation system 120 may include one or more computer(s), one or more monitor(s), and one or more input device(s) such as a keyboard, mouse, microphone. The thumbnail animation system 120 may also include other types of electronic equipment by which thumbnail animations for medical images may be generated. The controller 122 may be implemented in a computer such as a desktop computer or laptop computer. An example of a computer used in the thumbnail animation system 120 is shown in and described with respect to the computer system 600 shown in FIG. 6.

Using a computer, the thumbnail animation system 120 may perform a computer-implemented method of generating a medical imaging thumbnail animation. The thumbnail animation system 120 may obtain a plurality of medical images from a medical imaging examination. The medical imaging examination may be performed by the medical imaging system 110, and the resultant medical images may be provided to the thumbnail animation system 120. The thumbnail animation system 120 may automatically define a zone of interest to identify in the plurality of medical images. For example, the zone of interest may be defined based on a modality of the medical imaging by the medical imaging system 110, by a task performed in the medical imaging by the medical imaging system 110, and/or using information input by a user to an input device of the thumbnail animation system 120. The computer-implemented method implemented by the thumbnail animation system 120 may also include identifying, by the processor 1221, the zone of interest in the plurality of medical images using a trained artificial intelligence algorithm, and generating, using a second algorithm, the medical imaging thumbnail animation to simulate movement of a virtual camera on a path in the zone of interest in the plurality of medical images.

Figure 2:
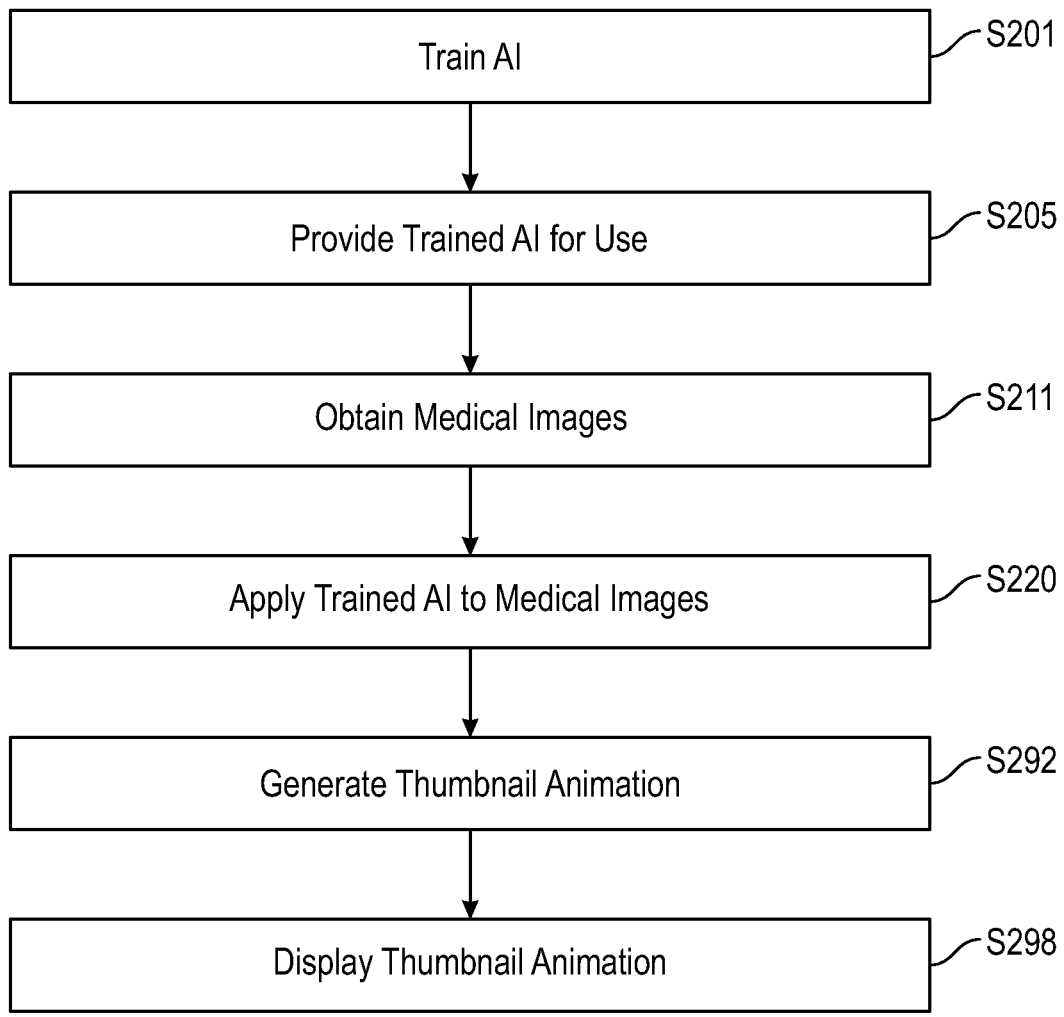
FIG. 2 illustrates a method for thumbnail animation for medical imaging, in accordance with a representative embodiment.

An overview of a method performed using the system 100 is shown in and described with respect to FIG. 2. A more detailed method performed by the thumbnail animation system 120 is shown in and described with respect to FIG. 4. A more detailed method performed by the user system 140 is shown in and described with respect to FIG. 7.

In FIG. 1, a processor 1221 may be used to implement one or more methods described herein. The processor 1221 may be any suitable processor type including, but not limited to, a microprocessor, a microcontroller, a digital signal processor (DSP), a field programmable array (FPGA) where the FPGA has been programmed to form a processor, a graphical processing unit (GPU), an application specific circuit (ASIC) where the ASIC has been designed to form a processor, or a combination thereof. The processor 1221 may include one or more cores, wherein one core may include an arithmetic logic unit (ALU) and/or another core may include a floating point logic unit (FPLU) and/or another core may include a digital signal processing unit (DSPU). The processor 1221 may also include one or more registers communicatively coupled to one or more core, and implemented using dedicated logic gate circuits (e.g., flip-flops) and/or any memory technology. Such registers may be implemented using static memory, and may provide data, instructions and addresses to a core.

FIG. 2 illustrates a method for thumbnail animation for medical imaging, in accordance with a representative embodiment.

The method of FIG. 2 may be performed using the system 100 of FIG. 1. In FIG. 2, the method starts at S201 by training artificial intelligence (AI). The result of training artificial intelligence (AI) may be a trained artificial intelligence algorithm, such as the trained artificial intelligence algorithm described herein.

At S205, the method of FIG. 2 includes providing trained artificial intelligence for user. The trained artificial intelligence provided at S205 may be a trained artificial intelligence algorithm provided as a computer program, and may be the result of the training at S201. An example of trained artificial intelligence described herein is a convolutional neural network. A convolutional neural network (CNN) is implemented by combining a filtering technique with the general neural network, and may be used in circumstances such as when a general neural network would result in an overly-complex set of weighted values that is drastically increased due to a large size of input data such as image data.

At S211, the method of FIG. 2 includes obtaining medical images. The medical images may be a plurality of medical images from a medical imaging examination. The medical images may be obtained from the memory system 130 in FIG. 1, and may be obtained by the thumbnail animation system 120 in FIG. 1

At S220, the method of FIG. 2 includes applying the trained artificial intelligence to the medical images. The trained artificial intelligence applied at S220 may be applied to identify a zone of interest in the plurality of medical images, using a trained artificial intelligence algorithm as described herein.

At S292, the method of FIG. 2 includes generating a thumbnail animation. The thumbnail animation may be generated at S292 using a second algorithm. The thumbnail animation may simulate movement of a virtual camera on a path in the zone of interest in the plurality of medical images.

At S298, the method of FIG. 2 includes displaying a thumbnail animation. The thumbnail animation may be displayed to a user using the user system 140 in FIG. 1. For example, a user may use the user system to search for particular series of medical images, and may retrieve a set of medical images corresponding to the thumbnail animation. Rather than having to review multiple individual medical images in the set of medical images, the user can review the thumbnail animation to determine whether the set of medical images are relevant to the query.

Figure 4:
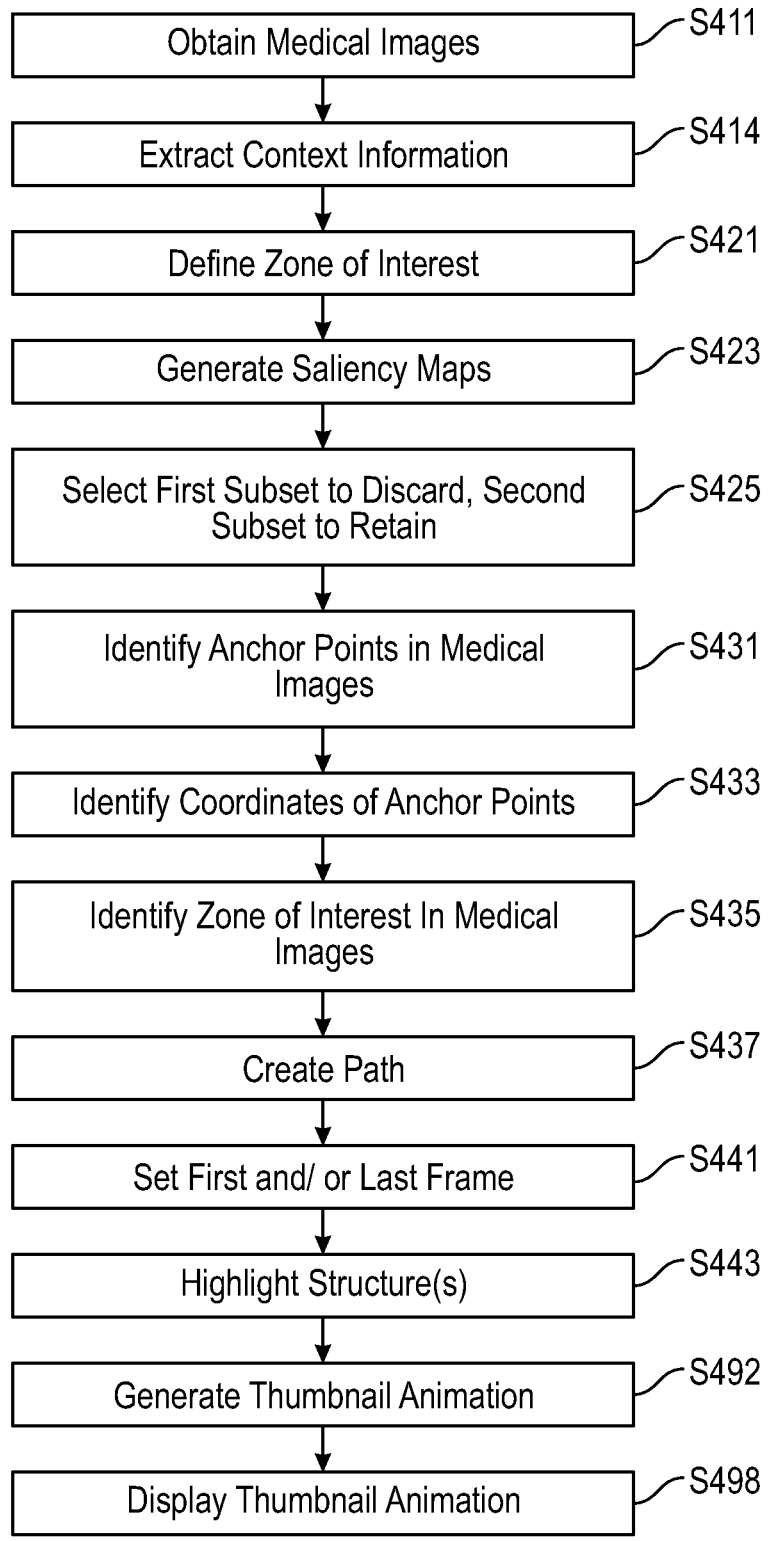
FIG. 4 illustrates another method for thumbnail animation for medical imaging, in accordance with a representative embodiment.

A detailed explanation of applying the trained artificial intelligence to the medical images as in S220 is provided with respect to FIG. 4.

Figure 3A:
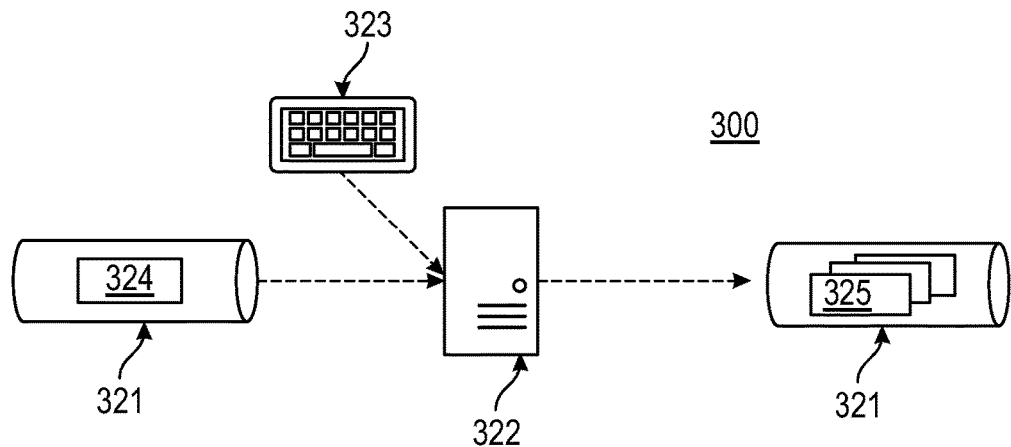
FIG. 3A illustrates a hybrid system and flow for thumbnail animation for medical imaging, in accordance with another representative embodiment.

FIG. 3A illustrates a hybrid system and flow for thumbnail animation for medical imaging, in accordance with another representative embodiment.

In FIG. 3A, a system 300 includes a memory 321, a computer 322, and an input device 323. The system 300 may be an example of the thumbnail animation system 120 in FIG. 1, and the computer 322 may include the controller 122 in FIG. 1. A set of medical images 324 is used to generate a thumbnail animation 325 by the computer 322 applying artificial intelligence to the set of medical images 324 in the manner described herein. A detailed explanation of applying the trained artificial intelligence to the medical images is provided with respect to FIG. 4.

Figure 3B:
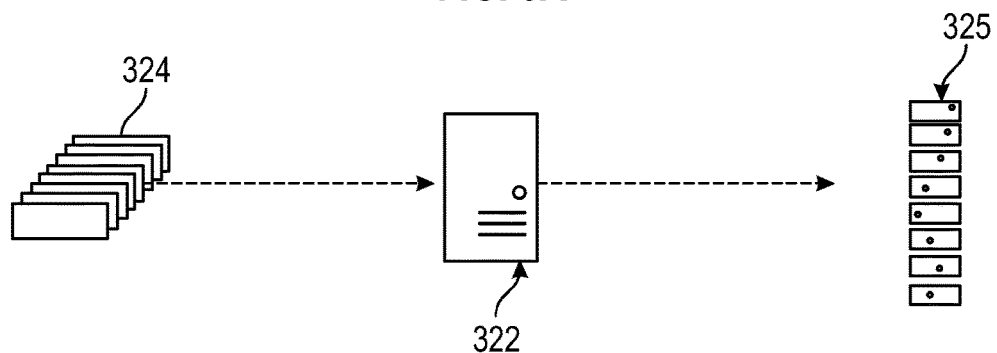
FIG. 3B illustrates an image set and flow for thumbnail animation for medical imaging, in accordance with another representative embodiment.

FIG. 3B illustrates an image set and flow for thumbnail animation for medical imaging, in accordance with another representative embodiment.

In FIG. 3B, the set of medical images 324 is subjected to processing by the computer 322 so as to generate the thumbnail animation 325. The thumbnails of the thumbnail animation 325 each include a zone of interest identified by a processor of the computer 322 applying a trained artificial intelligence algorithm to the set of medical images 324. The thumbnail animation 325 is generated using a second algorithm to simulate movement of a virtual camera on a path in the zone of interest in each of the set of medical images.

Figure 3C:
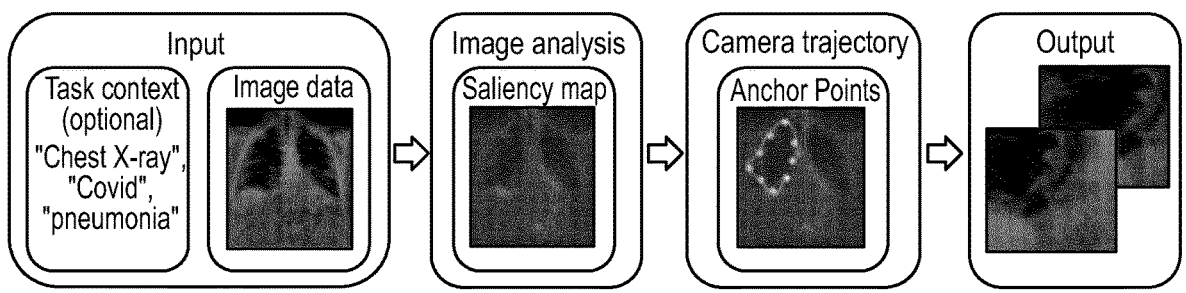
FIG. 3C illustrates an overview flow for thumbnail animation for medical imaging, in accordance with another representative embodiment.

FIG. 3C illustrates an overview flow for thumbnail animation for medical imaging, in accordance with another representative embodiment.

As shown in FIG. 3C, two-dimensional (2D) medical images are processed to generate a thumbnail animation. However, thumbnail animations may also be used to generate animated thumbnail visualizations for three-dimensional (3D) volumes of medical data. Software used to generate the thumbnail animation may be implemented using a software module that also includes imaging handling/image processing software.

In FIG. 3C, the medical images may be provided as digital files such as digital imaging and communications in medicine (DICOM) files. Digital medical image files may also include contextual data that can be input for processing. In FIG. 3C, the first process includes extracting context information from the fields of the DICOM files, or receiving the context information from a user such as via the input device 323 in FIG. 3A. The context information may include the imaging modality, such as CT or MRI, the task performed in the medical imaging, such as CT scan of abdomen or head, chest X-ray, or mammogram, and/or the organ of interest, such as liver or pancreas.

In FIG. 3C, the second process includes processing of image data of the medical images by an algorithm. The second process may include any of multiple different methods for estimating salient image regions and generating anchor points that later serve as centers of crops for creating frames of an animated thumbnail visualization. The anchor points are identified based on coordinates of pixels in a zone of interest designated in the medical image.

The image data processing in the second process may include analysis such as:

Organ detection, which includes either the delineation of an organ of interest by a bounding box (the minimum or smallest bounding or enclosing box for a point set in N dimensions), or the placing of a point at the center of this organ in the image Organ segmentation, which includes the labeling of the pixels belonging to an organ of interest by a flag Image classification, which assumes that a diagnostic decision can be made based on the whole image content, without detecting or segmenting anything in particular Attention map estimation, which includes the computation of a map, on a per-pixel basis, of some measure of importance of every pixel The second process may be performed by applying deep learning-based convolutional neural networks (CNN) as trained artificial intelligence. A goal of the second process is to narrow the focus of attention from the whole medical image to the most salient parts that may be of greater interest to the user. The image analysis in the second process may be performed on low resolution images by relatively simple and fast CNNs that have a small number of parameters. The medical image/volume data may be processed in the second process immediately after the medical image/volume data is acquired, or at some point between acquisition and inspection by a human operator.

A result of the image analysis performed in the second process may vary based on whether the second process includes object-segmentation, object detection, image classification, or attention map estimation. Besides segmentation masks and bounding boxes, class activation maps (CAM, GradCAM, etc.) may be produced for the task of image classification. Moreover, if a CNN that was trained on real human gaze data is available, the CNN may be used to produce an attention map for the given image.

If the second process includes object segmentation, the output may be a mask for organs of interest and an object probability map. Anchor points to designate the object(s) may include the boundaries of the mask, geometric extremities of an object mask shape, and/or a center of a segmented object.

If the second process includes object detection, the output may be a bounding box for organs of interest and/or an object probability map. Anchor points to designate the object(s) may include corners and a center of the bounding box, boundaries of thresholded object probability map, and/or local maximums of a probability map.

If the second process includes image classification, the output may be an image-based class label and/or a class activation map (CAM). Anchor points to designate the object(s) may include boundaries of a thresholded class activation map and/or local maximums of a class activation map.

If the second process includes attention map estimation, the output may be a map that imitates the fixation points of an expert's gaze. Anchor points to designate the object(s) may include boundaries of a thresholded saliency map and/or local maximums of a saliency map.

In FIG. 3C, a third process includes producing anchor points in the form of pixel coordinates. Anchor points may be found by thresholding the saliency/probability/attention maps and finding local maximums. Another way to produce anchor points is to select the pixels belonging to the isolines of a saliency map, or to the contours of a segmented organ, or to the borders of a bounding box in case of detection. In this latter case, the coordinates of the anchor point generally lie on a smooth curve. If there are several segmented or detected organs in the image, or several prominent maximums on the saliency map, then the centers of the segmented/detected regions and the locations of the most prominent saliency maximums may be selected as anchor points.

In FIG. 3C, a fourth process includes generating a trajectory for a virtual camera using the previously found anchor points. First, the list of anchor points is sorted by their pixel coordinates. Then, the coordinates of the anchor points belonging to the trajectory are computed by fitting a smooth curve, e.g. a spline, to the list of anchor points in different images. After the curve is found, additional anchor points are sampled from the curve in order to make the distribution of all anchor points from beginning till the end of the virtual camera trajectory more uniform. During sampling, the anchor point coordinates may be adjusted and become non-integer numbers. In this case, the frames that are centered on these anchor points can be generated by simple image interpolation, e.g. bilinear, bicubic, Lanczos, etc.

Using the process of FIG. 3C, animated thumbnail visualizations are generated with viewing time of approximately 5-7 seconds, which may correspond to 50 to 105 frames at 10 to 15 frames per second, and sampling ~50 anchor points along the trajectory. Longer animations may be avoided where they would not provide a quick glance at the data.

Additionally, in the process of FIG. 3C, the first and the last frames of the animated thumbnail visualization may be set as a downscaled image. In this case, several frames may be generated by zooming into the first anchor point from the trajectory, and by zooming out from the last anchor point to the general view of the whole image again. The frames may then be transformed into an animated thumbnail visualization which can be saved, for example, as an animated GIF file.

Moreover, image contrast or histogram modification such as windowing may be applied to the final animated thumbnail visualization in order to highlight particular structures. The windowing parameters may be selected based on the context information obtained in the first process. Pixel values may also be mapped to a particular color map such as "jet", "hsv", gray according to the user's preferences.

The process of FIG. 3C may be applied to three-dimensional volumes. For example, radiologists who scan throughout a slice attentively before moving to a new depth may be provided with a single slice passing through the center of an anomaly or an organ, and then the processes described above may be applied to generate a smooth viewing experience. Radiologists who limit their search to a narrow part of an organ while scrolling through slices in depth may be provided with an animated thumbnail visualization by scrolling through image slices, but focusing on a region of interest only, instead of the full image.

FIG. 4 illustrates another method for thumbnail animation for medical imaging, in accordance with a representative embodiment.

In FIG. 4, the method starts at S411 by obtaining medical images. The medical images may be obtained by the thumbnail animation system 120 from the memory system 130 directly or from the medical imaging system 110 directly or indirectly.

At S414, context information is extracted. The context information may be extracted from fields of files for the medical images, and may explain the context in which the medical images were captured. For example, context information may be extracted from fields of DICOM files. Alternatively, context information may be specified by a user inputting information to the thumbnail animation system 120. The context information may include a modality of the medical imaging in which the medical images were captured. Example modalities include, but are not limited to, CT and MRI. The context information may include a type of survey being performed when the medical images were captured. Example types of survey include, but are not limited to, a CT scan of abdomen or head, a chest X-ray, and a mammogram. The context information may also indicate an organ of interest captured in the medical images. Examples organs of interest include, but are not limited to, a liver or a pancreas.

At S421, a zone of interest is defined. The zone of interest defined at S421 may be defined by or using the context information from S414. The zone of interest may include anatomical features such as anatomical objects or regions to be identified in the medical images.

At S423, saliency maps are generated. The saliency maps may be generated by applying trained artificial intelligence to the medical images to find the zone of interest in each medical image. The trained artificial intelligence may comprise an algorithm based on deep learning that selects the most salient regions in still medical images or volumes. The selection is made based on the context extracted at S414 and the definition of the zone of interest at S421.

The analysis used to generate the saliency maps may include organ detection, organ segmentation, image classification and/or attention map estimation. Organ detection includes either the delineation of an organ of interest by a bounding box, or the placing of a point at the center of this organ in the image. Organ segmentation includes the labeling of the pixels belonging to an organ of interest by a flag. Image classification assumes that a diagnostic decision can be made based on the whole image content, without detecting or segmenting anything in particular. Attention map estimation includes the computation of a map, on a per-pixel basis, of some measure of importance of every pixel. The image analysis at S431 may be performed by applying deep learning-based convolutional neural networks (CNN), and a goal of the analysis at S431 is to narrow the focus of attention from the whole image to the most salient parts that may be of greater interest to the user. The image analysis at S431 may be performed on low resolution images by relatively simple and fast CNNs that have a small number of parameters. The medical image/volume data may be processed immediately after it is acquired by a medical imaging system 110, or at some point between acquisition and inspection by a human operator.

At S425, a first subset of medical images is selected to discard, and a second subset of medical images is selected to retain. The first subset of medical images may be medical images that are readily identified as missing the zone of interest.

At S431, anchor points are identified in the medical images. The anchor points are identified by processing image data using the trained artificial intelligence. Anchor points are produced in the form of pixel coordinates. The method of FIG. 4 may include identifying the anchor points based on coordinates of pixels for the zone of interest in the medical images. Anchor points can be found by thresholding the saliency/probability/attention maps and finding their local maximums. Another way to produce anchor points is to select the pixels belonging to the isolines of a saliency map, or to the contours of a segmented organ, or to the borders of a bounding box in case of detection. In this latter case, the coordinates of the anchor point would generally lie on a smooth curve. If there are several segmented or detected organs in the image, or several prominent maximums on the saliency map, then the centers of the segmented/detected regions and the locations of the most prominent saliency maximums may be selected as anchor points.

At S433, coordinates of the anchor points are identified in the medical images. The coordinates may be coordinates of pixels in two dimensions, such as perpendicular X and Y dimensions.

At S435, the zone of interest is identified in the medical images. The zone of interest corresponds to the anchor points, such as when the anchor points identify a center and/or periphery of the zone of interest. As an example, a zone of interest may be identified around an organ or another anatomical object, a tumor, an intersection of anatomical objects, or another type of object captured in the second subset of medical images.

At S437, a path is created through the second subset of medical images. The path may be a trajectory for a virtual camera generated using the previously found anchor points. The path may be created by highlighting or otherwise emphasizing the anchor points and/or zones of interest in the medical images of the selected second subset. The path may be created by a second algorithm that simulates the movement of a virtual camera through a set of salient regions in the image. The movement of the virtual camera may be simulated based on anchor points set in the medical images to identify the zones of interest in the medical images. The second algorithm may be used to generate a smoothed path in the zone of interest in the medical images. The method of FIG. 4 may include smoothing, using the second algorithm, the path in the zone of interest to generate the smoothed path.

Additionally, the second algorithm may smooth initially-selected anchor points in the process of creating the thumbnail animation. The smoothing may be performed by fitting a smooth curve, e.g. a spline, to the list of anchor points in different images. After the curve is found, additional anchor points may be sampled from in order to make the distribution of all anchor points from beginning till the end of the virtual camera trajectory more uniform. During sampling, the anchor point coordinates may be adjusted and become non-integer numbers. In this case, the frames that are centered on these anchor points can be generated by simple image interpolation, e.g. bilinear, bicubic, Lanczos, etc.

At S441, a first and/or last frame are set. The first frame and the last frame of the animated thumbnail visualization may be set by downscaling the entire frame in the same manner as a traditional thumbnail visualization in any graphical user interface (GUI).

At S443, a structure is highlighted. Image contrast or histogram modification, e.g. windowing, can be applied to the final animated thumbnail visualization in order to highlight particular structures. The windowing parameters can be selected based on the context information extracted from the image files or can be given by the user. Pixel values can also be mapped to a particular color map ("jet", "hsv", gray) according to the user's preferences.

At S492, a thumbnail animation is generated. The frames are then transformed into an animated thumbnail visualization which can be saved, for example, as an animated GIF file. The thumbnail animation may be generated to display frames of the animation at a frame rate between 10 frames per second and 15 frames per second, and may be targeted to last for 5 to 7 seconds.

At S498, the thumbnail animation is displayed. The thumbnail animation may be displayed at the frame rate of 10 frames per second and 15 frames per second, such as when a user using the user system 140 in FIG. 1 selects a file of medical images based on a search and wishes to review the thumbnail animation to see if the file of medical images seems relevant.

The description of FIG. 4 primarily applies to two-dimensional (2D) medical images. However, the method for thumbnail animation for medical imaging at FIG. 4 may also apply to generating animated thumbnail visualizations for three-dimensional (3D) volumes of medical data. The elements shown in FIG. 3C may perform some or all of the features of the method in FIG. 4, and a module included in image handling software may be used to perform these features at the thumbnail animation system 120.

Figure 5:
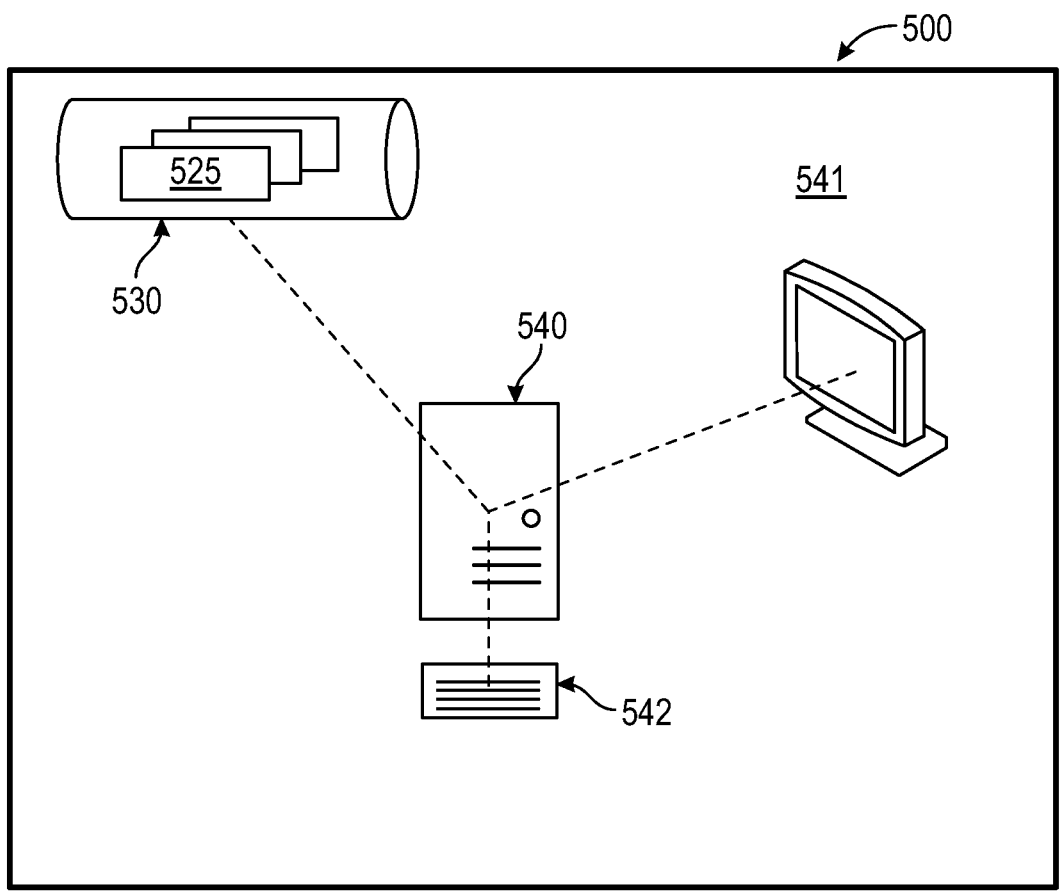
FIG. 5 illustrates a user system for thumbnail animation for medical imaging, in accordance with a representative embodiment.

FIG. 5 illustrates a user system for thumbnail animation for medical imaging, in accordance with a representative embodiment.

The user system in FIG. 5 may correspond to the user system 140 in FIG. 1, and may be used to retrieve and review image files and corresponding thumbnail animations. The computer 540 may be local to the display 541 and may be connected to the display 541 via a local wired interface such as an Ethernet cable or via a local wireless interface such as a Wi-Fi connection.

The computer 540 may include one or more input interface(s). The input interfaces (not shown) of the computer 540 may include ports, disk drives, wireless antennas, or other types of receiver circuitry. The input interfaces may further connect user interfaces, such as a mouse, a keyboard, a microphone, a video camera, a touchscreen display, or another element or component to the computer 540.

The display 541 may be a monitor such as a computer monitor, a display on a mobile device, a television, an electronic whiteboard, or another screen configured to display electronic imagery. The display 541 may also include one or more input interface(s) such as those noted above that may connect other elements or components to the computer 540, as well as a touch screen that enables direct input via touch.

Figure 6:
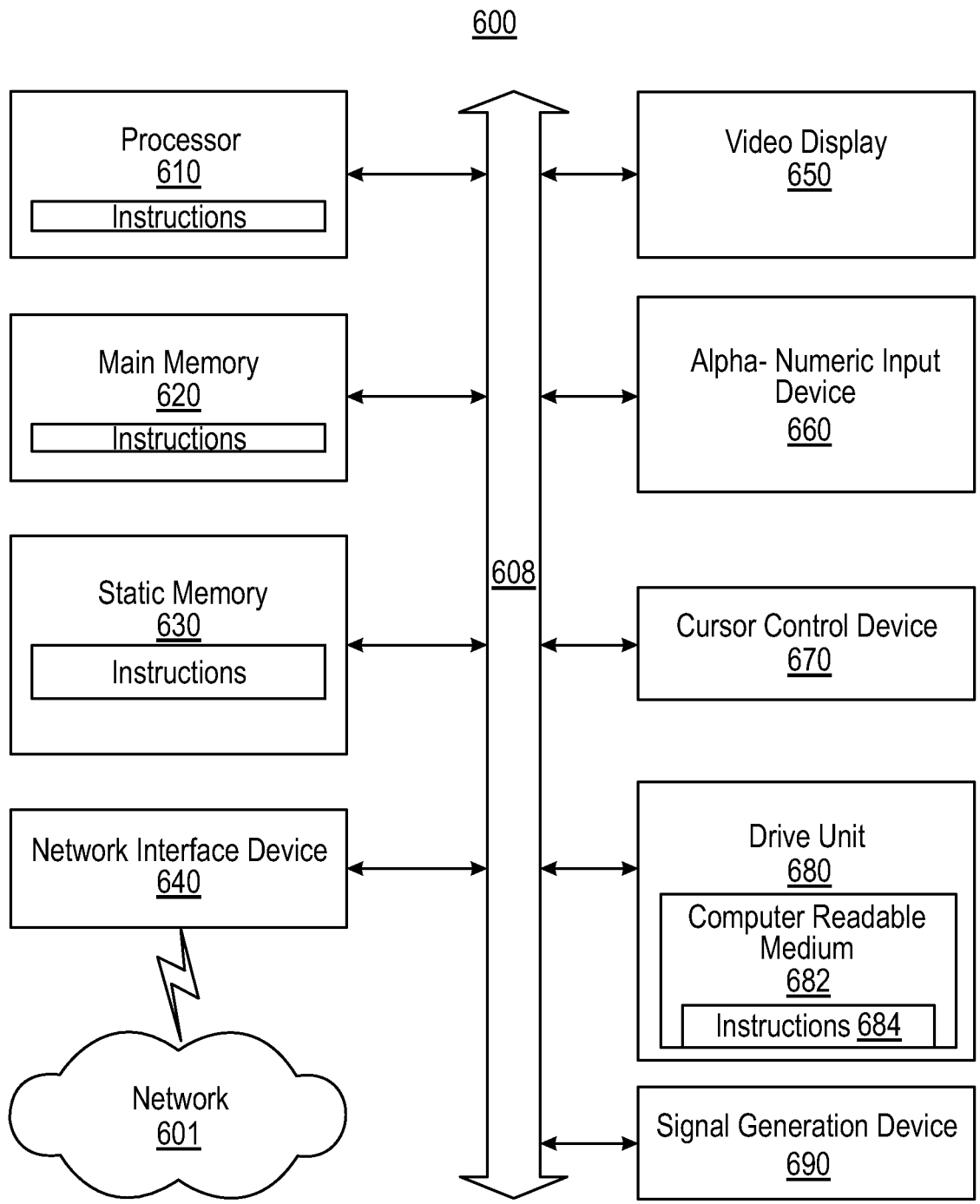
FIG. 6 illustrates a computer system, on which a method for thumbnail animation for medical imaging may be implemented, in accordance with a representative embodiment.

FIG. 6 illustrates a computer system, on which a method for thumbnail animation for medical imaging may be implemented, in accordance with a representative embodiment.

FIG. 6 illustrates a computer system, on which a method for thumbnail animation for medical imaging is implemented, in accordance with another representative embodiment.

The computer system 600 of FIG. 6 shows a complete set of components for a communications device or a computer device. However, a "controller" as described herein may be implemented with less than the set of components of FIG. 6, such as by a memory and processor combination. The computer system 600 may include some or all elements of one or more component apparatuses in a system for thumbnail animation for medical imaging herein, although any such apparatus may not necessarily include one or more of the elements described for the computer system 900 and may include other elements not described.

Referring to FIG. 6, the computer system 600 includes a set of software instructions that can be executed to cause the computer system 600 to perform any of the methods or computer-based functions disclosed herein. The computer system 600 may operate as a standalone device or may be connected, for example, using a network 601, to other computer systems or peripheral devices. In embodiments, a computer system 600 performs logical processing based on digital signals received via an analog-to-digital converter.

In a networked deployment, the computer system 600 operates in the capacity of a server or as a client user computer in a server-client user network environment, or as a peer computer system in a peer-to-peer (or distributed) network environment. The computer system 600 can also be implemented as or incorporated into various devices, such as the thumbnail animation system 120 or the user system 140 in FIG. 1, a stationary computer, a mobile computer, a personal computer (PC), a laptop computer, a tablet computer, or any other machine capable of executing a set of software instructions (sequential or otherwise) that specify actions to be taken by that machine. The computer system 600 can be incorporated as or in a device that in turn is in an integrated system that includes additional devices. In an embodiment, the computer system 600 can be implemented using electronic devices that provide voice, video, or data communication. Further, while the computer system 600 is illustrated in the singular, the term "system" shall also be taken to include any collection of systems or sub-systems that individually or jointly execute a set, or multiple sets, of software instructions to perform one or more computer functions.

As illustrated in FIG. 6, the computer system 600 includes a processor 610. The processor 610 may be considered a representative example of the processor 1221 of the controller 122 in FIG. 1 and executes instructions to implement some or all aspects of methods and processes described herein. The processor 610 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 610 is an article of manufacture and/or a machine component. The processor 610 is configured to execute software instructions to perform functions as described in the various embodiments herein. The processor 610 may be a general-purpose processor or may be part of an application specific integrated circuit (ASIC). The processor 610 may also be a microprocessor, a microcomputer, a processor chip, a controller, a microcontroller, a digital signal processor (DSP), a state machine, or a programmable logic device. The processor 610 may also be a logical circuit, including a programmable gate array (PGA), such as a field programmable gate array (FPGA), or another type of circuit that includes discrete gate and/or transistor logic. The processor 610 may be a central processing unit (CPU), a graphics processing unit (GPU), or both. Additionally, any processor described herein may include multiple processors, parallel processors, or both. Multiple processors may be included in, or coupled to, a single device or multiple devices.

The term "processor" as used herein encompasses an electronic component able to execute a program or machine executable instruction. References to a computing device comprising "a processor" should be interpreted to include more than one processor or processing core, as in a multi-core processor. A processor may also refer to a collection of processors within a single computer system or distributed among multiple computer systems. The term computing device should also be interpreted to include a collection or network of computing devices each including a processor or processors. Programs have software instructions performed by one or multiple processors that may be within the same computing device or which may be distributed across multiple computing devices.

The computer system 600 further includes a main memory 620 and a static memory 630, where memories in the computer system 600 communicate with each other and the processor 610 via a bus 608. Either or both of the main memory 620 and the static memory 630 may be considered representative examples of the memory 1222 of the controller 122 in FIG. 1B, and store instructions used to implement some or all aspects of methods and processes described herein. Memories described herein are tangible storage mediums for storing data and executable software instructions and are non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The main memory 620 and the static memory 630 are articles of manufacture and/or machine components. The main memory 620 and the static memory 630 are computer-readable mediums from which data and executable software instructions can be read by a computer (e.g., the processor 610). Each of the main memory 620 and the static memory 630 may be implemented as one or more of random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. The memories may be volatile or non-volatile, secure and/or encrypted, unsecure and/or unencrypted.

"Memory" is an example of a computer-readable storage medium. Computer memory is any memory which is directly accessible to a processor. Examples of computer memory include, but are not limited to RAM memory, registers, and register files. References to "computer memory" or "memory" should be interpreted as possibly being multiple memories. The memory may for instance be multiple memories within the same computer system. The memory may also be multiple memories distributed amongst multiple computer systems or computing devices.

As shown, the computer system 600 further includes a video display unit 650, such as a liquid crystal display (LCD), an organic light emitting diode (OLED), a flat panel display, a solid-state display, or a cathode ray tube (CRT), for example. Additionally, the computer system 600 includes an input device 660, such as a keyboard/virtual keyboard or touch-sensitive input screen or speech input with speech recognition, and a cursor control device 670, such as a mouse or touch-sensitive input screen or pad. The computer system 600 also optionally includes a disk drive unit 680, a signal generation device 690, such as a speaker or remote control, and/or a network interface device 640.

In an embodiment, as depicted in FIG. 6, the disk drive unit 680 includes a computer-readable medium 682 in which one or more sets of software instructions 684 (software) are embedded. The sets of software instructions 684 are read from the computer-readable medium 682 to be executed by the processor 610. Further, the software instructions 684, when executed by the processor 610, perform one or more steps of the methods and processes as described herein. In an embodiment, the software instructions 684 reside all or in part within the main memory 620, the static memory 630 and/or the processor 610 during execution by the computer system 600. Further, the computer-readable medium 682 may include software instructions 684 or receive and execute software instructions 684 responsive to a propagated signal, so that a device connected to a network 601 communicates voice, video, or data over the network 601. The software instructions 684 may be transmitted or received over the network 601 via the network interface device 640.

In an embodiment, dedicated hardware implementations, such as application-specific integrated circuits (ASICs), field programmable gate arrays (FPGAs), programmable logic arrays and other hardware components, are constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

Figure 7:
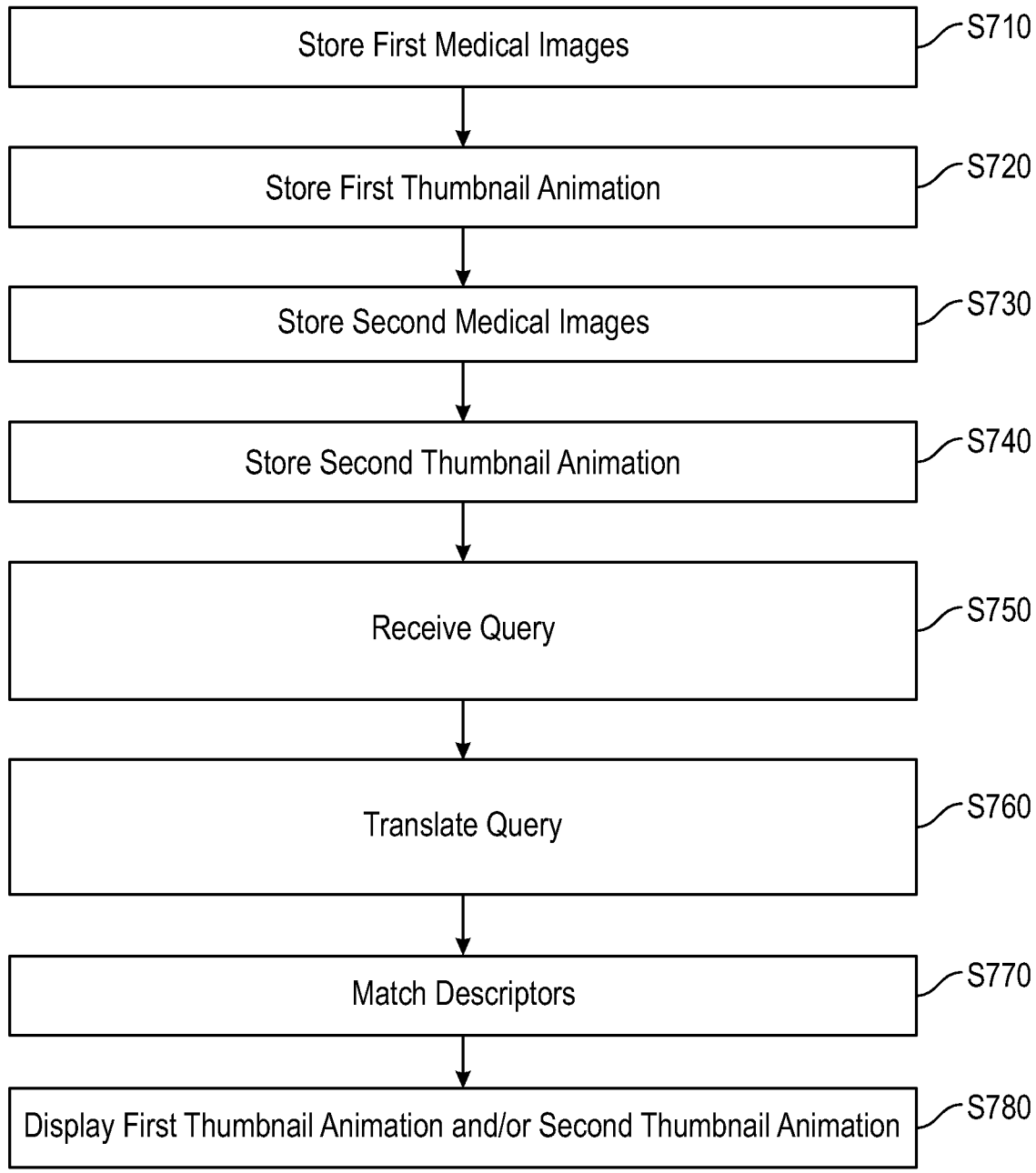
FIG. 7 illustrates another method for thumbnail animation for medical imaging, in accordance with a representative embodiment.

FIG. 7 illustrates another method for thumbnail animation for medical imaging, in accordance with a representative embodiment.

The method of FIG. 7 starts at S710 with storing first medical images. The first medical images may be stored in the memory system 130 in FIG. 1

At S720 the method of FIG. 7 includes storing a first thumbnail animation. The first thumbnail animation may be generated by the thumbnail animation system 120 in FIG. 1, and is generated based on the first medical images stored at S710. The first thumbnail animation may be stored with first descriptors that describe subject matter in the first medical images.

At S730, the method of FIG. 7 includes storing second medical images. The second medical images may be stored in the memory system 130 in FIG. 1

At S740, the method of FIG. 7 includes storing a second thumbnail animation. The second thumbnail animation may be generated by the thumbnail animation system 120 in FIG. 1, and is generated based on the second medical images stored at S730. The second thumbnail animation may be stored with second descriptors that describe subject matter in the second medical images.

The descriptors stored at S720 and S740 may include descriptions of tasks performed in the first medical imaging examination and the second medical imaging examination. The descriptors may also or alternatively include descriptions of a modality of the medical imaging used in the first medical imaging examination and the second medical imaging examination, and/or a type of medical condition being addressed in the first medical imaging examination and the second medical imaging examination.

Additionally, medical images from a first medical examination and a second medical examination are described for the method of FIG. 7. Nevertheless, it will be understood that medical images from dozens, hundreds or thousands of medical examinations may be stored and processed in the same or a similar way so that medical imaging thumbnail animations may be selectively retrieved from numerous available medical imaging thumbnail animations generated based on numerous medical examinations.

At S750, the method of FIG. 7 includes receiving a query. The query may be received from a user using the user system 140 in FIG. 1, such as via a keyboard command, a cursor selection, or a voice command.

At S760, the method of FIG. 7 includes translating the query. The query may be translated using natural language processing into descriptors of a type that may match the first descriptors from S720 and/or the second descriptors from S740.

At S770, the method of FIG. 7 includes matching descriptors from the query to descriptors for the first thumbnail animation and/or the second thumbnail animation.

At S780 the method of FIG. 7 includes displaying the first thumbnail animation and/or the second thumbnail animation, based on matching the descriptors at S770. For example, a user may enter the query into the user system 140, the query may be translated into appropriate descriptors and result in retrieval of one or more files of medical images and corresponding thumbnail animations from the memory system 130. The user may then select files individually to review the thumbnail animations for the content of the medical images in the individual medical files, and determine whether the selected files are relevant. If the selected file is relevant, the user may review the selected file in more detail.

As noted already, the teachings herein are primarily described in the context of two-dimensional (2D) thumbnail animations. However, an extension to three-dimensional volumes is also applicable. A first group of radiologists viewing volume data such as CT scans tend to search throughout a slice attentively before moving to a new depth. For the first group, an informative animated thumbnail visualization may consist of a single slice passing through the center of an anomaly or an organ, and then the teachings herein relating to generating a smooth viewing experience can be applied. A second group of radiologists viewing volume data tend to limit their search to a narrow part of an organ while scrolling through slices in depth. For the second group, an appropriate animated thumbnail visualization would display scrolling through image slices, but focusing on a region of interest only, instead of the full image.

Accordingly, thumbnail animation for medical imaging may help prevent unnecessary loading of large datasets in PACS and save time for clinical specialists by generating an animated thumbnail visualization which demonstrates the medical images, or parts of medical images, that are most relevant to the task. The features described herein also provide a way of finding and selecting the image (or volume) parts that are most relevant for the radiologist and including them into the thumbnail visualization. Thumbnail animation for medical imaging may therefore provide a fast and rough visualization of medical images prior to a more thorough inspection of the data by a human expert.

Although thumbnail animation for medical imaging has been described with reference to several exemplary embodiments, it is understood that the words that have been used are words of description and illustration, rather than words of limitation. Changes may be made within the purview of the appended claims, as presently stated, and as amended, without departing from the scope and spirit of thumbnail animation for medical imaging in its aspects. Although thumbnail animation for medical imaging has been described with reference to particular means, materials and embodiments, thumbnail animation for medical imaging is not intended to be limited to the particulars disclosed; rather thumbnail animation for medical imaging extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A computer-implemented method of generating a medical imaging thumbnail animation, comprising:
   obtaining a plurality of medical images from a medical imaging examination;
   automatically defining a zone of interest to identify in the plurality of medical images;
   identifying, by a processor, the zone of interest in the plurality of medical images using a trained artificial intelligence algorithm;
   generating, using a second algorithm, the medical imaging thumbnail animation to simulate movement of a virtual camera on a path in the zone of interest in the plurality of medical images
   wherein generating the animation comprises identifying a respective anchor point within the zone of interest in each image, and wherein the anchor points serve as centers of crops of the images, and wherein each crop forms a thumbnail frame of the thumbnail animation, and wherein the anchor points together define said path in the zone of interest.

2. The computer-implemented method of claim 1, further comprising:
   identifying the anchor points in each image based on coordinates of pixels for the zone of interest; and
   creating the path in the zone of interest in the plurality of medical images using the anchor points.

3. The computer-implemented method of claim 2, further comprising:
   generating saliency maps for the plurality of medical images; and
   identifying coordinates of pixels for the zone of interest based on the saliency maps.

4. The computer-implemented method of claim 2, further comprising:
   setting a first frame of the medical imaging thumbnail animation as a thumbnail without an anchor point or a zone of interest; and
   setting a last frame of the medical imaging thumbnail animation as a thumbnail without an anchor point or a zone of interest.

5. The computer-implemented method of claim 4, further comprising:
   highlighting at least one structure in the last frame of the medical imaging thumbnail animation.

6. The computer-implemented method of claim 1, further comprising:
   smoothing, using the second algorithm, the path in the zone of interest in the plurality of medical images to generate a smoothed path in the zone of interest in the plurality of medical images.

7. The computer-implemented method of claim 1, wherein the zone of interest is automatically identified based on at least one of a task to be performed based on the medical imaging examination or an imaging modality of the medical imaging examination.

8. The computer-implemented method of claim 1, further comprising:
   selecting a subset of the medical images which include the zone of interest,
   wherein the medical imaging thumbnail animation includes medical images only from the subset of the medical images which include the zone of interest.

9. The computer-implemented method of claim 1, further comprising:
   extracting context information from fields of files for the medical images, wherein the trained artificial intelligence algorithm is applied to the plurality of medical images to identify the zone of interest in the plurality of medical images based on the context information.

10. The computer-implemented method of claim 1, wherein the trained artificial intelligence algorithm comprises a deep learning-based convolutional neural network.

11. The computer-implemented method of claim 1, wherein frames of the medical imaging thumbnail animation are displayed at a frame rate between 10 frames per second and 15 frames per second.

12. A system for generating a medical imaging thumbnail animation, comprising:
a memory that stores instructions and medical images from a plurality of medical imaging examinations;
a processor that executes the instructions to process the medical images from the plurality of medical imaging examinations, wherein, when executed by the processor, the instructions cause the system to:
obtain a plurality of medical images from a medical imaging examination;
automatically define a zone of interest to identify in the plurality of medical images;
identify the defined zone of interest in each of the plurality of medical images using a trained artificial intelligence algorithm; and
generate, using a second algorithm, the medical imaging thumbnail animation to simulate movement of a virtual camera on a path in the zone of interest in the plurality of medical images,
wherein generating the animation comprises identifying a respective anchor point within the zone of interest in each image, and wherein the anchor points serve as centers of crops of the images, and wherein each crop forms a thumbnail frame of the thumbnail animation, and wherein the anchor points together define said path in the zone of interest.

13. The system of claim 12, further comprising:
a display that displays the medical imaging thumbnail animation based on the system receiving a selection of the plurality of medical images.

14. The system of claim 12, further comprising:
at least one medical imaging system that generates the plurality of medical images.

15. The system of claim 12, further comprising:
an artificial intelligence training system that trains the trained artificial intelligence algorithm.

16. The system of claim 12, further comprising:
a picture archiving and communication system comprising a display that displays the medical imaging thumbnail animation based on the system receiving a selection of the plurality of medical images.

17. A non-transitory computer-readable medium storing instructions for generating a medical imaging thumbnail animation that, when executed by one or more processors, cause the one ore more processors to:
obtain a plurality of medical images from a medical imaging examination;
automatically define a zone of interest to identify in the plurality of medical images;
select a subset of the medical images which include the zone of interest;
identify the defined zone of interest in each of the subset of the medical images by using a trained artificial intelligence algorithm;
generate, using a second algorithm, the medical imaging thumbnail animation to simulate movement of a virtual camera on a path in the zone of interest in the plurality of medical images; and
highlight at least one structure in the last frame of the medical imaging thumbnail animation;
wherein generating the animation comprises identifying a respective anchor point within the zone of interest in each image and based on coordinates of pixels for the zone of interest, the anchor points serve as centers of crops of the images, and each crop forms a thumbnail frame of the thumbnail animation, and wherein the anchor points together define said path in the zone of interest.

18. The non-transitory computer-readable medium of claim 17, wherein the instructions further causes the one or more processors to:
generate saliency maps for the plurality of medical images; and
identify coordinates of pixels for the zone of interest based on the saliency maps.

19. The non-transitory computer-readable medium of claim 17, wherein the zone of interest is automatically identified based on at least one of a task to be performed based on the medical imaging examination or an imaging modality of the medical imaging examination.

20. The non-transitory computer-readable medium of claim 17, wherein the instructions further causes the one or more processors to:
extract context information from fields of files for the medical images, wherein the trained artificial intelligence algorithm is applied to the plurality of medical images to identify the zone of interest in the plurality of medical images based on the context information.

* * * * *